(12) United States Patent
Huang (10) Patent No.: US 11,393,248 B2
(45) Date of Patent: Jul. 19, 2022

(54) DATA DETECTION METHOD AND DEVICE, COMPUTER EQUIPMENT AND STORAGE MEDIUM

(71) Applicant: PING AN TECHNOLOGY (SHENZHEN) CO., LTD., Guangdong (CN)

(72) Inventor: Jinlun Huang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/264,311

(22) PCT Filed: Jun. 29, 2020

(86) PCT No.: PCT/CN2020/098819
§ 371 (c)(1),
(2) Date: Jan. 29, 2021

(87) PCT Pub. No.: WO2021/073150
PCT Pub. Date: Apr. 22, 2021

(65) Prior Publication Data
US 2022/0114833 A1 Apr. 14, 2022

(30) Foreign Application Priority Data

Oct. 16, 2019 (CN) .......................... 201910984349.6

(51) Int. Cl.
*G06V 40/16* (2022.01)
*G06V 10/762* (2022.01)
(Continued)

(52) U.S. Cl.
CPC .............. *G06V 40/166* (2022.01); *G06T 5/50* (2013.01); *G06V 10/762* (2022.01); *G06V 10/82* (2022.01); *G06V 40/172* (2022.01)

(58) Field of Classification Search
CPC .... G06V 40/166; G06V 10/762; G06V 10/82; G06V 40/172; G06V 40/161; G06T 5/50; G06K 9/6201; G06K 9/6221
See application file for complete search history.

(56) References Cited

U.S. PATENT DOCUMENTS

2007/0217683 A1* 9/2007 Kinoshita .......... G06V 10/7553
382/190
2015/0139520 A1* 5/2015 Senegas ............... G06K 9/6269
382/131
(Continued)

*Primary Examiner* — Xuemei G Chen (57) ABSTRACT

Disclosed are a data detection method and device, a computer equipment, and a storage medium. The method includes: obtaining a designated identification picture including a human face; correcting the designated identification picture to be placed in a preset standard posture to obtain an intermediate picture; inputting the intermediate picture into a preset face feature point detection model to obtain multiple face feature points; calculating a cluster center position of the face feature points, and generating a minimum bounding rectangle of the face feature points; retrieving a standard identification picture from a preset database; scaling the standard identification picture in proportion to obtain a scaled picture; overlapping a reference center position in the scaled picture and a cluster center position in the intermediate picture, so as to obtain an overlapping part in the intermediate picture; and marking the overlapping part as an identification body of the designated identification picture.

19 Claims, 3 Drawing Sheets (51) Int. Cl.
*G06V 10/82* (2022.01)
*G06T 5/50* (2006.01)

(56) References Cited

U.S. PATENT DOCUMENTS

| | | | |
|---|---|---|---|
| 2016/0165216 A1* | 6/2016 | Wu | H04N 13/15 |
| | | | 348/223.1 |
| 2018/0349682 A1* | 12/2018 | Wong | G06V 40/172 |
| 2019/0228211 A1* | 7/2019 | Chen | G06V 40/172 |
| 2019/0318151 A1* | 10/2019 | Shichijo | G06K 9/6215 |
| 2020/0151502 A1* | 5/2020 | Huang | G06K 9/627 |
| 2020/0226354 A1* | 7/2020 | Chen | G06T 7/73 |
| 2020/0334812 A1* | 10/2020 | Su | G06T 7/60 |
| 2020/0394392 A1* | 12/2020 | Wang | G06V 40/40 |
| 2021/0027081 A1* | 1/2021 | Zhang | G06V 10/82 |
| 2022/0051000 A1* | 2/2022 | Zhou | G06K 9/6271 |

\* cited by examiner

DATA DETECTION METHOD AND DEVICE, COMPUTER EQUIPMENT AND STORAGE MEDIUM

This application claims priority to Chinese Patent Application No. 201910984349.6, filed with the China National Intellectual Property Administration on Oct. 16, 2019, and entitled "DATA DETECTION METHOD AND DEVICE, COMPUTER EQUIPMENT AND STORAGE MEDIUM", which is incorporated herein by reference in its entirety.

TECHNICAL FIELD

This application relates to the field of artificial intelligence technologies, and in particular, to a data detection method and device, a computer equipment, and a storage medium.

BACKGROUND

An analysis of an identification picture is very common in production and life of today's society. For example, an identification picture needs to be captured and uploaded for a service to be handled. If an identification body in an identification picture can be accurately detected (because the field of view of a generally captured identification picture is larger than that of an identification body, the identification body generally does not fill the entire identification picture), subsequent analysis of the identification picture can be improved. A conventional method for detecting an identification body is generally to obtain coordinates of the identification body (for example, four vertex coordinates of a matrix identification body) based on pixel detection. The inventors realize that the method consumes considerable calculation resources and has a low recognition accuracy for blurred identifications (because the identification is blurred, the boundary of the identification body is not clear, and the identification body recognized by using the conventional method is inaccurate).

Technical Problems

The main object of this application is to provide a data detection method and device, a computer equipment, and a storage medium, so as to improve accuracy of data detection.

Technical Solutions

To achieve the foregoing object of the present invention, according to a first aspect, this application provides a data detection method, including the following steps:

obtaining a designated identification picture including a human face, where an identification image in the designated identification picture is rectangular;

correcting, by using a preset posture correction method, the designated identification picture to be placed in a preset standard posture to obtain an intermediate picture;

inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, where the plurality of face feature points are all inside the minimum bounding rectangle;

obtaining a designated identification type of the designated identification picture by using a preset identification type acquisition method, and retrieving a standard identification picture from a preset database, where the standard identification picture is of the designated identification type, the standard identification picture is marked with a reference rectangle and a reference center position, and an identification image in the standard identification picture fills the entire standard identification picture;

scaling the standard identification picture in proportion, so that an area of the reference rectangle is equal to an area of the minimum bounding rectangle, so as to obtain a scaled picture;

overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

According to a second aspect, this application provides a data detection device, including:

a designated identification picture acquisition unit, configured to obtain a designated identification picture including a human face, where an identification image in the designated identification picture is rectangular;

a posture correction unit, configured to correct, by using a preset posture correction method, the designated identification picture to be placed in a preset standard posture to obtain an intermediate picture;

a face feature point acquisition unit, configured to input the intermediate picture into a preset face feature point detection model for calculation to obtain a plurality of face feature points output by the face feature point detection model;

a cluster center position calculation unit, configured to calculate a cluster center position of the plurality of face feature points by using a preset clustering algorithm, and generate a minimum bounding rectangle of the plurality of face feature points, where the plurality of face feature points are all inside the minimum bounding rectangle;

a standard identification picture retrieval unit, configured to obtain a designated identification type of the designated identification picture by using a preset identification type acquisition method, and retrieve a standard identification picture from a preset database, where the standard identification picture is of the designated identification type, the standard identification picture is marked with a reference rectangle and a reference center position, and an identification image in the standard identification picture fills the entire standard identification picture;

a scaled picture acquisition unit, configured to scale the standard identification picture in proportion, so that an area of the reference rectangle is equal to an area of the minimum bounding rectangle, so as to obtain a scaled picture;

an overlapping part acquisition unit, configured to overlap the scaled picture and the standard identification picture through translation, so that a reference center position in the scaled picture overlaps a cluster center position in the intermediate picture, so as to obtain an overlapping part in the intermediate picture; and an identification body marking unit, configured to mark the overlapping part in the intermediate picture as an identification body of the designated identification picture.

According to a third aspect, this application provides a computer equipment, including a memory and a processor, where the memory stores computer-readable instructions, and the processor implements a data detection method when executing the computer-readable instructions, where the data detection method includes the following steps:

obtaining a designated identification picture including a human face, where an identification image in the designated identification picture is rectangular;

correcting, by using a preset posture correction method, the designated identification picture to be placed in a preset standard posture to obtain an intermediate picture;

inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, where the plurality of face feature points are all inside the minimum bounding rectangle;

obtaining a designated identification type of the designated identification picture by using a preset identification type acquisition method, and retrieving a standard identification picture from a preset database, where the standard identification picture is of the designated identification type, the standard identification picture is marked with a reference rectangle and a reference center position, and an identification image in the standard identification picture fills the entire standard identification picture;

scaling the standard identification picture in proportion, so that an area of the reference rectangle is equal to an area of the minimum bounding rectangle, so as to obtain a scaled picture;

overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

According to a fourth aspect, this application provides a computer-readable storage medium, where the storage medium stores computer-readable instructions, and a processor implements a data detection method when executing the computer-readable instructions, where the data detection method includes the following steps:

obtaining a designated identification picture including a human face, where an identification image in the designated identification picture is rectangular;

correcting, by using a preset posture correction method, the designated identification picture to be placed in a preset standard posture to obtain an intermediate picture;

inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, where the plurality of face feature points are all inside the minimum bounding rectangle;

obtaining a designated identification type of the designated identification picture by using a preset identification type acquisition method, and retrieving a standard identification picture from a preset database, where the standard identification picture is of the designated identification type, the standard identification picture is marked with a reference rectangle and a reference center position, and an identification image in the standard identification picture fills the entire standard identification picture;

scaling the standard identification picture in proportion, so that an area of the reference rectangle is equal to an area of the minimum bounding rectangle, so as to obtain a scaled picture;

overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

BENEFICIAL EFFECT

The data detection method and device, the computer equipment, and the storage medium in this application improve accuracy of data detection.

DESCRIPTION OF EMBODIMENTS

Figure 1:
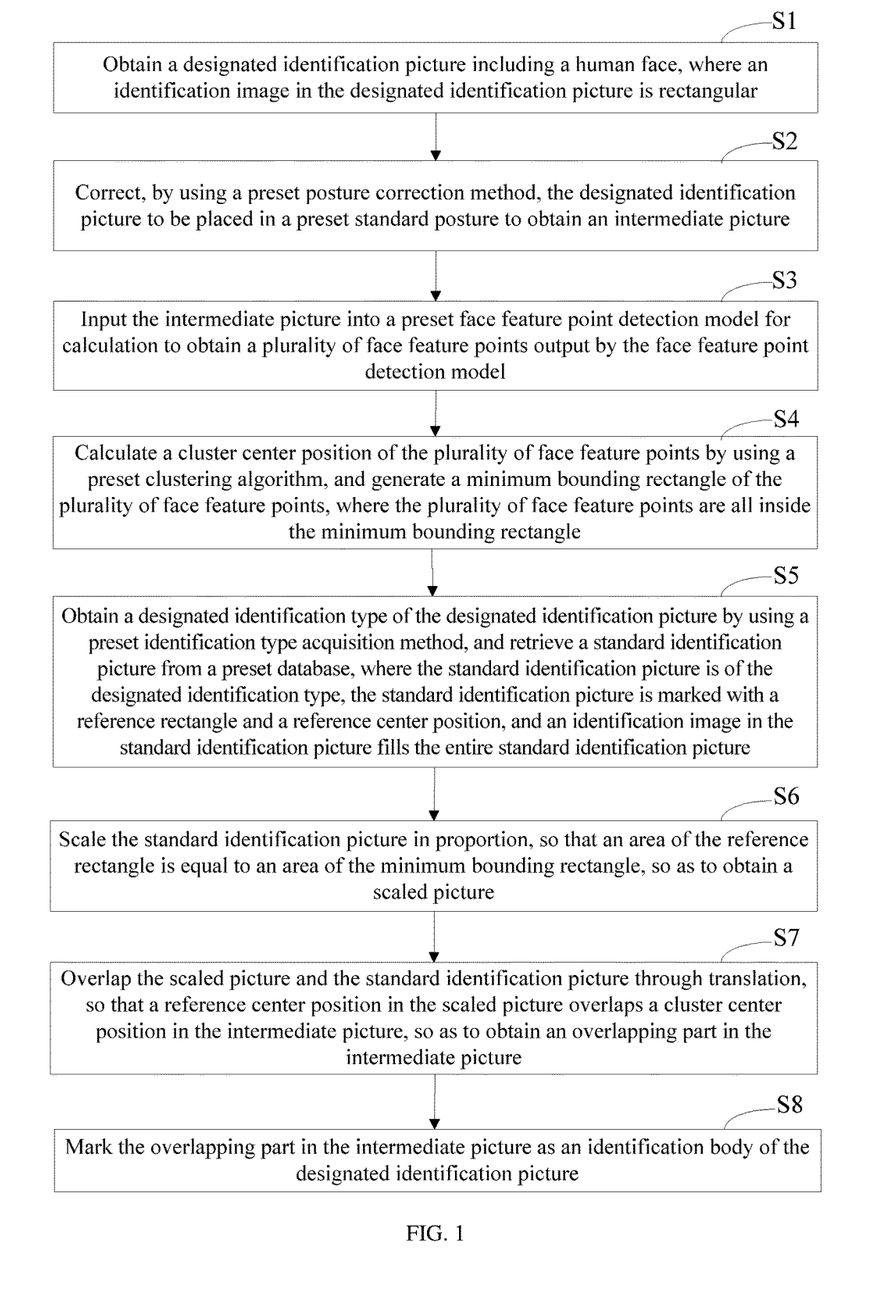
FIG. 1 is a schematic flowchart of a data detection method according to an embodiment of this application.

Referring to FIG. 1, an embodiment of this application provides a data detection method, including the following steps:

S1. Obtain a designated identification picture including a human face, where an identification image in the designated identification picture is rectangular.

S2. Correct, by using a preset posture correction method, the designated identification picture to be placed in a preset standard posture to obtain an intermediate picture.

S3. Input the intermediate picture into a preset face feature point detection model for calculation to obtain a plurality of face feature points output by the face feature point detection model.

S4. Calculate a cluster center position of the plurality of face feature points by using a preset clustering algorithm, and generate a minimum bounding rectangle of the plurality of face feature points, where the plurality of face feature points are all inside the minimum bounding rectangle.

S5. Obtain a designated identification type of the designated identification picture by using a preset identification type acquisition method, and retrieve a standard identification picture from a preset database, where the standard identification picture is of the designated identification type, the standard identification picture is marked with a reference rectangle and a reference center position, and an identification image in the standard identification picture fills the entire standard identification picture.

S6. Scale the standard identification picture in proportion, so that an area of the reference rectangle is equal to an area of the minimum bounding rectangle, so as to obtain a scaled picture.

S7. Overlap the scaled picture and the standard identification picture through translation, so that a reference center position in the scaled picture overlaps a cluster center position in the intermediate picture, so as to obtain an overlapping part in the intermediate picture.

S8. Mark the overlapping part in the intermediate picture as an identification body of the designated identification picture.

As described in step S1, a designated identification picture including a human face is obtained, where an identification picture in the designated identification picture is rectangular. Commonly used identification pictures generally include faces, and the data detection method according to this application is implemented based on face detection, and therefore the method can be applied to identification pictures including faces, and is widely applicable.

As described in step S2, the designated identification picture is corrected, by using a preset posture correction method, to be placed in a preset standard posture to obtain an intermediate picture. Because the designated identification picture may be placed in any posture, if the picture is not adjusted to be placed in the standard posture, subsequent calculation will be affected. Therefore, the designated identification picture is corrected, by using the preset posture correction method, to be placed in the preset standard posture, so as to obtain the intermediate picture. The standard posture may be any posture, preferably a posture most suitable for viewing or processing (that is, when being presented in a screen, the intermediate picture faces a reader facing the screen). For example, the posture correction method includes: detecting a plurality of edges in the designated identification picture by using a preset image edge detection method, and obtaining a designated edge pair from the plurality of edges, where the designated edge pair includes two parallel and equal designated edge line segments; determining whether a length of the designated edge line segment satisfies M=max(M1, M2, . . . , Mn), where M is the length of the designated edge line segment, M1, M2, . . . , Mn are lengths of all the edge line segments in the plurality of edges, and the plurality of edges include n edge line segments in total; if the length of the designated edge line segment satisfies M=max(M1, M2, . . . , Mn), placing the designated identification picture in a designated posture, so as to obtain a first picture, where the designated posture refers to the designated edge pair parallel to a preset reference line; inputting the first picture into a preset image posture classification model for calculation, so as to obtain a classification result output by the image posture classification model, where the classification result includes the standard posture, the standard posture rotated counterclockwise by 90 degrees, the standard posture rotated counterclockwise by 180 degrees, or the standard posture rotated counterclockwise by 270 degrees; determining whether the classification result is the standard posture; and if the classification result is not the standard posture, rotating the first picture based on the classification result, so as to obtain the intermediate picture placed in the preset standard posture.

As described in step S3, the intermediate picture is input into a preset face feature point detection model for calculation to obtain a plurality of face feature points output by the face feature point detection model. The face feature point detection model is used to detect special positions in the face, such as symmetrical pupils. For example, a method for obtaining the face feature point detection model includes: obtaining pre-collected sample data, and dividing the sample data into training data and test data, where the sample data includes only an identification picture placed in the standard posture and face feature points marked in the identification picture placed in the standard posture; training a preset neural network model by using the training data and a stochastic gradient descent method, so as to obtain a temporary model; verifying the temporary model by using the test data, and determining whether the verification succeeds; and if the verification succeeds, recording the temporary model as the face feature point detection model.

As described in step S4, a cluster center position of the plurality of face feature points is calculated by using a preset clustering algorithm, and a minimum bounding rectangle of the plurality of face feature points is generated, where the plurality of face feature points are all inside the minimum bounding rectangle. The clustering algorithm may be any feasible algorithm, such as a KNN clustering algorithm. Further, for example, a method for calculating the cluster center position of the plurality of face feature points includes: dividing the plurality of face feature points into symmetric feature points and asymmetric feature points by using a preset symmetric point classification method, where all the symmetric feature points are symmetric with respect to the same symmetry axis, and the symmetry axis is parallel to one edge of the identification image; calculating a first cluster sub-center and a second cluster sub-center by using a preset clustering algorithm, where the first cluster sub-center is a center of all the symmetric feature points, and the second cluster sub-center is a center of all the asymmetric feature points; and recording a position of a midpoint of a line connecting the first cluster sub-center and the second cluster sub-center as the cluster center position of the plurality of face feature points. Therefore, efficiency of obtaining the cluster center position is improved.

As described in step S5, a designated identification type of the designated identification picture is obtained by using a preset identification type acquisition method, and a standard identification picture is retrieved from a preset database, where the standard identification picture is of the designated identification type, the standard identification picture is marked with a reference rectangle and a reference center position, and an identification image in the standard identification picture fills the entire standard identification picture. The reference rectangle and the reference center position correspond to the minimum bounding rectangle and the cluster center position, respectively, and are used as a basis for determining a final identification body. For example, an identification type acquisition method includes: recognizing the designated identification picture by using a preset text recognition technology, so as to obtain a text; calculating a similarity value Sim between the text and a pre-stored reference text by using $$Sim = \frac{\sum_{i=1}^{n} PiKi}{\sqrt{\sum_{i=1}^{n} Pi^2} \sqrt{\sum_{i=1}^{n} Ki^2}},$$

where P is a word frequency vector of the text, K is a word frequency vector of the reference text, Pi is the number of occurrences of the $i^{th}$ word in the text, and Ki is the number of occurrences of the $i^{th}$ word in the reference text; determining whether the similarity value Sim is greater than a preset similarity threshold; if the similarity value Sim is greater than the preset similarity threshold, obtaining the designated identification type corresponding to the designated identification picture according to a preset correspondence relationship among the designated identification picture, the text, the reference text, and the identification type.

As described in step S6, the standard identification picture is scaled in proportion, so that an area of the reference rectangle is equal to an area of the minimum bounding rectangle, so as to obtain a scaled picture. The standard identification picture is scaled in proportion, so that the relative proportional relationship among the reference center position, the reference rectangle, and the identification image of the standard identification picture does not change. The area of the reference rectangle is equal to the area of the minimum bounding rectangle. Therefore, after the scaled picture is obtained, the proportional relationship between the scaled picture and the real identification picture is equal to the proportional relationship between the intermediate picture and the real identification picture. Accordingly, the scaled picture and the standard identification picture are overlapped to detect the identification body.

As described in step S7, the scaled picture and the standard identification picture are overlapped through translation, so that a reference center position in the scaled picture overlaps a cluster center position in the intermediate picture, so as to obtain an overlapping part in the intermediate picture. A purpose of translation is to prevent the proportional relationship from changing again, which may affect subsequent detection results. As can be learned from the foregoing description, the proportional relationship between the scaled picture and the real identification picture is equal to the proportional relationship between the intermediate picture and the real identification picture. In addition, the identification image in the standard identification picture fills the entire standard identification picture. Therefore, the overlapping part in the intermediate picture is the identification body.

As described in step S8, the overlapping part in the intermediate picture is marked as the identification body of the designated identification picture. Further, a cutting operation may be performed to remove other areas of the intermediate picture except the identification body, so as to avoid meaningless processing of the other areas in subsequent picture processing and avoiding a waste of computational effort.

In an embodiment, step S2 includes:

S201. Detect a plurality of edges in the designated identification picture by using a preset image edge detection method, and obtain a designated edge pair from the plurality of edges, where the designated edge pair includes two parallel and equal designated edge line segments.

S202. Determine whether a length of the designated edge line segment satisfies $M=\max(M1, M2, \ldots, Mn)$, where M is the length of the designated edge line segment, $M1, M2, \ldots, Mn$ are lengths of all the edge line segments in the plurality of edges, and the plurality of edges include n edge line segments in total.

S203. If the length of the designated edge line segment satisfies $M=\max(M1, M2, \ldots, Mn)$, place the designated identification picture in a designated posture, so as to obtain a first picture, where the designated posture refers to the designated edge pair parallel to a preset reference line.

S204. Input the first picture into a preset image posture classification model for calculation, so as to obtain a classification result output by the image posture classification model, where the classification result includes the standard posture, the standard posture rotated counterclockwise by 90 degrees, the standard posture rotated counterclockwise by 180 degrees, or the standard posture rotated counterclockwise by 270 degrees.

S205. Determine whether the classification result is the standard posture.

S206. If the classification result is not the standard posture, rotate the first picture based on the classification result, so as to obtain the intermediate picture placed in the preset standard posture.

As described above, the designated identification picture is corrected, by using the preset posture correction method, to be placed in the preset standard posture, so that the intermediate picture is obtained. For example, the image edge detection method is used to perform contour recognition on the designated identification picture to obtain a contour, and a contour line is used as the edge. The largest contour in the designated identification picture is a rectangular identification image. Therefore, the designated edge pair may be a pair of parallel edges of the identification image, and if the length of the designated edge line segment satisfies $M=\max(M1, M2, \ldots, Mn)$, it may be determined that the designated edge pair is the longest pair of parallel edges of the identification image. Therefore, the designated identification picture is placed in the designated posture, so as to obtain the first picture, where the designated posture refers to the designated edge pair parallel to a preset reference line. The first picture is input into a preset image posture classification model for calculation, so as to obtain a classification result output by the image posture classification model, where the classification result includes the standard posture, the standard posture rotated counterclockwise by 90 degrees, the standard posture rotated counterclockwise by 180 degrees, or the standard posture rotated counterclockwise by 270 degrees; and if the classification result is not the standard posture, the first picture is rotated based on the classification result, so as to obtain the intermediate picture placed in the preset standard posture, so that the designated identification picture is corrected to be placed in the preset standard posture. The image posture classification model may be any feasible model, such as a neural network model or an inception-v3 classification model. Because the designated edge line segment is recognized in this application, and the image posture classification model is used for posture recognition, the accuracy of posture correction can be ensured, and the obtained intermediate picture is indeed placed in the standard posture.

In an embodiment, the image posture classification model is trained based on the inception-v3 classification model, and before step S204, the method includes:

S2031. Obtain a first training set including a designated number of training samples, where the training samples include identification pictures preset to be placed in the standard posture.

S2032. Rotate all the identification pictures in the first training set counterclockwise by 90 degrees, 180 degrees, and 270 degrees, so as to correspondingly obtain a second training set, a third training set, and a fourth training set.

S2033. Train a preset inception-v3 classification model through rotation training, so as to obtain the image posture classification model, where the rotation training means that the same number of identification pictures are extracted, as training data, from the first training set, the second training set, the third training set, and the fourth training set during the same round of training.

As described above, an image posture classification model is obtained. The inception-v3 classification model is one of the inception series classification models, is a deep neural network model, is particularly suitable for image classification, and is a mature classification model. Details are not described herein. In this application, the first training set, the second training set, the third training set and the fourth training set are constructed in such a manner that an angle difference of pictures between adjacent training sets is 90, four training sets are formed, and rotation training is performed, so that uniform training can be ensured, and the obtained image posture classification model is not merely applicable to classification of a specific posture, thereby improving robustness of the image posture classification model.

In an embodiment, the face feature point detection model is trained based on a neural network model, and before step S3, the method includes:

S21. Obtain pre-collected sample data, and divide the sample data into training data and test data, where the sample data includes only an identification picture placed in the standard posture and face feature points marked in the identification picture placed in the standard posture.

S22. Train a preset neural network model by using the training data and a stochastic gradient descent method, so as to obtain a temporary model.

S23. Verify the temporary model by using the test data, and determine whether the verification succeeds.

S24. If the verification succeeds, record the temporary model as the face feature point detection model.

As described above, the face feature point detection model is obtained. According to this application, training is performed by using special training data, where the special training data includes only an identification picture placed in the standard posture and face feature points marked in the identification picture placed in the standard posture. Because only the identification picture placed in one posture is used, the training data and the training efficiency are improved. In addition, it can be learned from the foregoing description that the intermediate picture is placed in the standard posture, the accuracy of the recognition result is ensured (because the trained face feature point detection model can be used to accurately recognize the identification picture placed in the standard posture). The neural network model is, for example, a VGG-F model or a DPN131 model. In the stochastic gradient descent method, some training data is randomly sampled to replace all training data, thereby further improving the training efficiency. Then the temporary model is verified. If the verification succeeds, the temporary model is recorded as the face feature point detection model. Therefore, the training efficiency is improved without reducing the recognition accuracy.

In an embodiment, step S4 includes:

S401. Divide the plurality of face feature points into symmetric feature points and asymmetric feature points by using a preset symmetric point classification method, where all the symmetric feature points are symmetric with respect to the same symmetry axis, and the symmetry axis is parallel to one edge of the identification image.

S402. Calculate a first cluster sub-center and a second cluster sub-center by using a preset clustering algorithm, where the first cluster sub-center is a center of all the symmetric feature points, and the second cluster sub-center is a center of all the asymmetric feature points.

S403. Record a position of a midpoint of a line connecting the first cluster sub-center and the second cluster sub-center as the cluster center position of the plurality of face feature points.

As described above, the cluster center position of the plurality of face feature points is calculated by using the preset clustering algorithm. Because the face is symmetrical, most of the face feature points are also symmetrical. Accordingly, the plurality of face feature points are divided into symmetric feature points and asymmetric feature points by using the preset symmetric point classification method, where all the symmetric feature points are symmetric with respect to the same symmetry axis, and the symmetry axis is parallel to one edge of the identification image. Actually, the symmetry axis is the symmetry axis of the face, that is, the symmetry axis of eyes, nostrils, mouth, and ears of a person. The clustering algorithm may be any feasible algorithm, such as a KNN clustering algorithm. Because the plurality of face feature points are divided into two categories, the calculation can be accelerated by separately performing clustering calculation for different categories. In addition, because of the clustering calculation for the symmetric points, the final first cluster sub-center will be located on the symmetry axis, so that the calculation is more convenient and further accelerated. Then, the position of the midpoint of the line connecting the first cluster sub-center and the second cluster sub-center is recorded as the cluster center position of the plurality of face feature points. Therefore, the calculation is accelerated.

In an embodiment, before step S5, the method includes:

S41. Obtain a pre-collected reference identification picture placed in the standard posture, where a type of the reference identification picture is the designated identification type.

S42. Input the reference identification picture into a preset face feature point detection model for calculation to obtain a plurality of reference face feature points output by the face feature point detection model.

S43. Calculate a cluster center position of the plurality of reference face feature points by using a preset clustering algorithm, and mark the cluster center position as a reference center position.

S44. Generate a minimum bounding rectangle of the plurality of reference face feature points, and mark the minimum bounding rectangle as a reference rectangle, where the plurality of reference face feature points are all inside the reference rectangle.

S45. Record the reference identification picture marked with the reference rectangle and the reference center position as the standard identification picture.

As described above, the standard identification picture is obtained. Because the standard identification picture is used for comparison with the intermediate picture, a method for obtaining the standard identification picture should be the same as a method for obtaining the intermediate picture. Accordingly, a pre-collected reference identification picture placed in the standard posture is obtained, where a type of the reference identification picture is the designated identification type; the reference identification picture is input into a preset face feature point detection model for calculation to obtain a plurality of reference face feature points output by the face feature point detection model; a cluster center position of the plurality of reference face feature points is calculated by using a preset clustering algorithm, and the cluster center position is marked as a reference center position; and a minimum bounding rectangle of the plurality of reference face feature points is generated, and the minimum bounding rectangle is marked as a reference rectangle, where the plurality of reference face feature points are all inside the reference rectangle. The standard identification picture obtained can be used for comparison with the intermediate picture. Because the type of the obtained standard identification picture, the reference center position, and the reference rectangle correspond to the type of the intermediate picture, the cluster center position, and the minimum bounding rectangle, respectively, the accuracy of subsequent detection of the identification body can be ensured.

In an embodiment, step S5 includes

S501. Recognize the designated identification picture by using a preset text recognition technology, so as to obtain a text.

S502.

Calculate a similarity value Sim between the text and a plurality of pre-stored reference texts by using $$Sim = \frac{\sum_{i=1}^{n} PiKi}{\sqrt{\sum_{i=1}^{n} Pi^2} \sqrt{\sum_{i=1}^{n} Ki^2}},$$

where P is a word frequency vector of the text, K is a word frequency vector of the reference text, Pi is the number of occurrences of the $i^{th}$ word in the text, and Ki is the number of occurrences of the $i^{th}$ word in the reference text.

S503. Obtain a designated reference text, where a similarity value corresponding to the designated reference text is greater than a similarity value corresponding to any other reference text.

S504. Obtain the designated identification type corresponding to the designated identification picture according to a preset corresponding relationship among the designated identification picture, the text, the designated reference text, and the identification type.

As described above, the designated identification type of the designated identification picture is obtained by using the preset identification type acquisition method. Different types of identifications have characters in different forms. For example, a driver's license includes a word indicating a driver's license, an ID card includes an ID number. Different types of certificates do not include characters in the same standard, and therefore the characters in different standards can be used as the basis for determining the types of certificates. Accordingly, in this application, the designated identification picture is recognized by using a preset text recognition technology, so as to obtain a text;

a similarity value Sim between the text and a plurality of pre-stored reference texts is calculated by using $$Sim = \frac{\sum_{i=1}^{n} PiKi}{\sqrt{\sum_{i=1}^{n} Pi^2} \sqrt{\sum_{i=1}^{n} Ki^2}},$$

where P is a word frequency vector of the text, K is a word frequency vector of the reference text, Pi is the number of occurrences of the ith word in the text, and Ki is the number of occurrences of the ith word in the reference text; a designated reference text is obtained, where a similarity value corresponding to the designated reference text is greater than a similarity value corresponding to any other reference text; and the designated identification type corresponding to the designated identification picture is obtained according to a preset corresponding relationship among the designated identification picture, the text, the designated reference text, and the identification type. The plurality of reference texts are obtained by recognizing different types of blank identifications. The text includes characters in all forms, and the specific type of identification picture also includes characters in the same form. This is reflected by the similarity value Sim. That is, the similarity value corresponding to the designated reference text (that is, the reference text corresponding to the same type of identification pictures) is greater than the similarity value corresponding to any other reference text. The word frequency vector includes the number of occurrences of the word as a component vector. Because the similarity calculation method based on the word frequency vector does not need to invoke a word vector library to obtain the corresponding word vector, the calculation is accelerated, so that the designated identification type can be quickly obtained.

Figure 2:
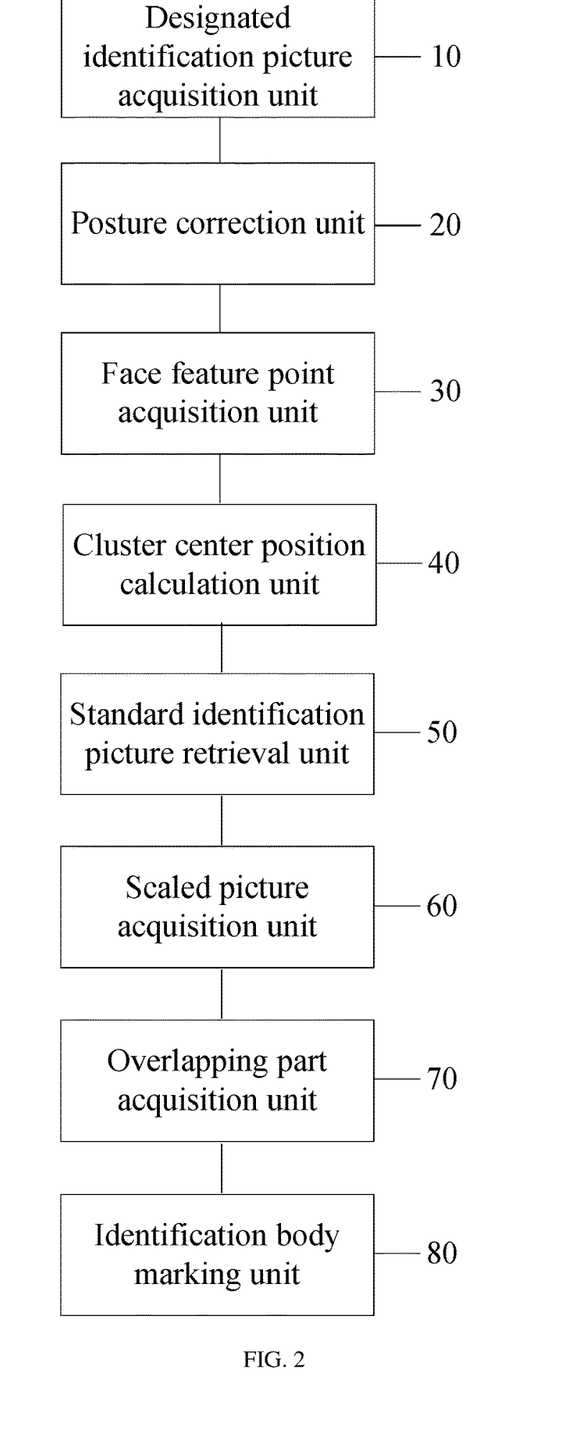
FIG. 2 is a schematic structural block diagram of a data detection device according to an embodiment of this application.

Referring to FIG. 2, an embodiment of this application provides a data detection device, including:

a designated identification picture acquisition unit 10, configured to obtain a designated identification picture including a human face, where an identification image in the designated identification picture is rectangular;

a posture correction unit 20, configured to correct, by using a preset posture correction method, the designated identification picture to be placed in a preset standard posture to obtain an intermediate picture;

a face feature point acquisition unit 30, configured to input the intermediate picture into a preset face feature point detection model for calculation to obtain a plurality of face feature points output by the face feature point detection model;

a cluster center position calculation unit 40, configured to calculate a cluster center position of the plurality of face feature points by using a preset clustering algorithm, and generate a minimum bounding rectangle of the plurality of face feature points, where the plurality of face feature points are all inside the minimum bounding rectangle;

a standard identification picture retrieval unit 50, configured to obtain a designated identification type of the designated identification picture by using a preset identification type acquisition method, and retrieve a standard identification picture from a preset database, where the standard identification picture is of the designated identification type, the standard identification picture is marked with a reference rectangle and a reference center position, and an identification image in the standard identification picture fills the entire standard identification picture;

a scaled picture acquisition unit 60, configured to scale the standard identification picture in proportion, so that an area of the reference rectangle is equal to an area of the minimum bounding rectangle, so as to obtain a scaled picture;

an overlapping part acquisition unit 70, configured to overlap the scaled picture and the standard identification picture through translation, so that a reference center position in the scaled picture overlaps a cluster center position in the intermediate picture, so as to obtain an overlapping part in the intermediate picture; and an identification body marking unit 80, configured to mark the overlapping part in the intermediate picture as an identification body of the designated identification picture.

The operations performed by the foregoing units are in one-to-one correspondence with the steps of the data detection method according to the foregoing embodiment. Details are not described herein again.

In an embodiment, the posture correction unit 20 includes:

an edge detection subunit, configured to detect a plurality of edges in the designated identification picture by using a preset image edge detection method, and obtain a designated edge pair from the plurality of edges, where the designated edge pair includes two parallel and equal designated edge line segments;

a designated edge line segment determining subunit, configured to determine whether a length of the designated edge line segment satisfies M=max(M1, M2, . . . , Mn), where M is the length of the designated edge line segment, M1, M2, . . . , Mn are lengths of all the edge line segments in the plurality of edges, and the plurality of edges include n edge line segments in total;

a first picture placing subunit, configured to place the designated identification picture in a designated posture if the length of the designated edge line segment satisfies M=max(M1, M2, . . . , Mn), so as to obtain a first picture, where the designated posture refers to the designated edge pair parallel to a preset reference line;

a classification result acquisition subunit, configured to input the first picture into a preset image posture classification model for calculation, so as to obtain a classification result output by the image posture classification model, where the classification result includes the standard posture, the standard posture rotated counterclockwise by 90 degrees, the standard posture rotated counterclockwise by 180 degrees, or the standard posture rotated counterclockwise by 270 degrees;

a standard posture determining subunit, configured to determine whether the classification result is the standard posture; and a first picture rotation subunit, configured to rotate the first picture based on the classification result if the classification result is not the standard posture, so as to obtain the intermediate picture placed in the preset standard posture.

The operations performed by the foregoing subunits are in one-to-one correspondence with the steps of the data detection method according to the foregoing embodiment. Details are not described herein again.

In an embodiment, the image posture classification model is trained based on an inception-v3 classification model, and the device includes:

a first training set acquisition unit, configured to obtain a first training set including a designated number of training samples, where the training samples include identification pictures preset to be placed in the standard posture;

a first training set rotation unit, configured to rotate all the identification pictures in the first training set counterclockwise by 90 degrees, 180 degrees, and 270 degrees, so as to correspondingly obtain a second training set, a third training set, and a fourth training set;

a rotation training unit, configured to train a preset inception-v3 classification model through rotation training, so as to obtain the image posture classification model, where the rotation training means that the same number of identification pictures are extracted, as training data, from the first training set, the second training set, the third training set, and the fourth training set during the same round of training.

The operations performed by the foregoing units are in one-to-one correspondence with the steps of the data detection method according to the foregoing embodiment. Details are not described herein again.

In an embodiment, the face feature point detection model is trained based on a neural network model, and the device includes:

a sample data acquisition unit, configured to obtain pre-collected sample data, and divide the sample data into training data and test data, where the sample data includes only an identification picture placed in the standard posture and face feature points marked in the identification picture placed in the standard posture;

a stochastic gradient descent training unit, configured to train a preset neural network model by using the training data and a stochastic gradient descent method, so as to obtain a temporary model;

a temporary model verification unit, configured to verify the temporary model by using the test data, and determine whether the verification succeeds; and a face feature point detection model marking unit, configured to record the temporary model as the face feature point detection model if the verification succeeds.

The operations performed by the foregoing units are in one-to-one correspondence with the steps of the data detection method according to the foregoing embodiment. Details are not described herein again.

In an embodiment, the cluster center position calculation unit 40 includes:

a feature point dividing subunit, configured to divide the plurality of face feature points into symmetric feature points and asymmetric feature points by using a preset symmetric point classification method, where all the symmetric feature points are symmetric with respect to the same symmetry axis, and the symmetry axis is parallel to one edge of the identification image;

a cluster calculation subunit, configured to calculate a first cluster sub-center and a second cluster sub-center by using a preset clustering algorithm, where the first cluster sub-center is a center of all the symmetric feature points, and the second cluster sub-center is a center of all the asymmetric feature points; and a cluster center position acquisition subunit, configured to record a position of a midpoint of a line connecting the first cluster sub-center and the second cluster sub-center as the cluster center position of the plurality of face feature points.

The operations performed by the foregoing subunits are in one-to-one correspondence with the steps of the data detection method according to the foregoing embodiment. Details are not described herein again.

In an embodiment, the device includes:

a reference identification picture acquisition unit, configured to obtain a pre-collected reference identification picture placed in the standard posture, where a type of the reference identification picture is the designated identification type;

a reference face feature point acquisition unit, configured to input the reference identification picture into a preset face feature point detection model for calculation to obtain a plurality of reference face feature points output by the face feature point detection model;

a reference center position acquisition unit, configured to calculate a cluster center position of the plurality of reference face feature points by using a preset clustering algorithm, and mark the cluster center position as a reference center position;

a reference rectangle acquisition unit, configured to generate a minimum bounding rectangle of the plurality of reference face feature points, and mark the minimum bounding rectangle as a reference rectangle, where the plurality of reference face feature points are all inside the reference rectangle; and a standard identification picture marking unit, configured to record the reference identification picture marked with the reference rectangle and the reference center position as the standard identification picture.

The operations performed by the foregoing units are in one-to-one correspondence with the steps of the data detection method according to the foregoing embodiment. Details are not described herein again.

In an embodiment, the standard identification picture retrieval unit 50 includes:

a designated identification picture recognition subunit, configured to recognize the designated identification picture by using a preset text recognition technology, so as to obtain a text;

a similarity value Sim calculation subunit, configured to calculate a similarity value Sim between the text and a plurality of pre-stored reference texts by using $$Sim = \frac{\sum_{i=1}^{n} PiKi}{\sqrt{\sum_{i=1}^{n} Pi^2} \sqrt{\sum_{i=1}^{n} Ki^2}},$$

where P is a word frequency vector of the text, K is a word frequency vector of the reference text, Pi is the number of occurrences of the $i^{th}$ word in the text, and Ki is the number of occurrences of the $i^{th}$ word in the reference text;

a designated reference text acquisition subunit, configured to obtain a designated reference text, where a similarity value corresponding to the designated reference text is greater than a similarity value corresponding to any other reference text; and a designated identification type acquisition subunit, configured to obtain the designated identification type corresponding to the designated identification picture according to a preset corresponding relationship among the designated identification picture, the text, the designated reference text, and the identification type.

The operations performed by the foregoing subunits are in one-to-one correspondence with the steps of the data detection method according to the foregoing embodiment. Details are not described herein again.

Figure 3:
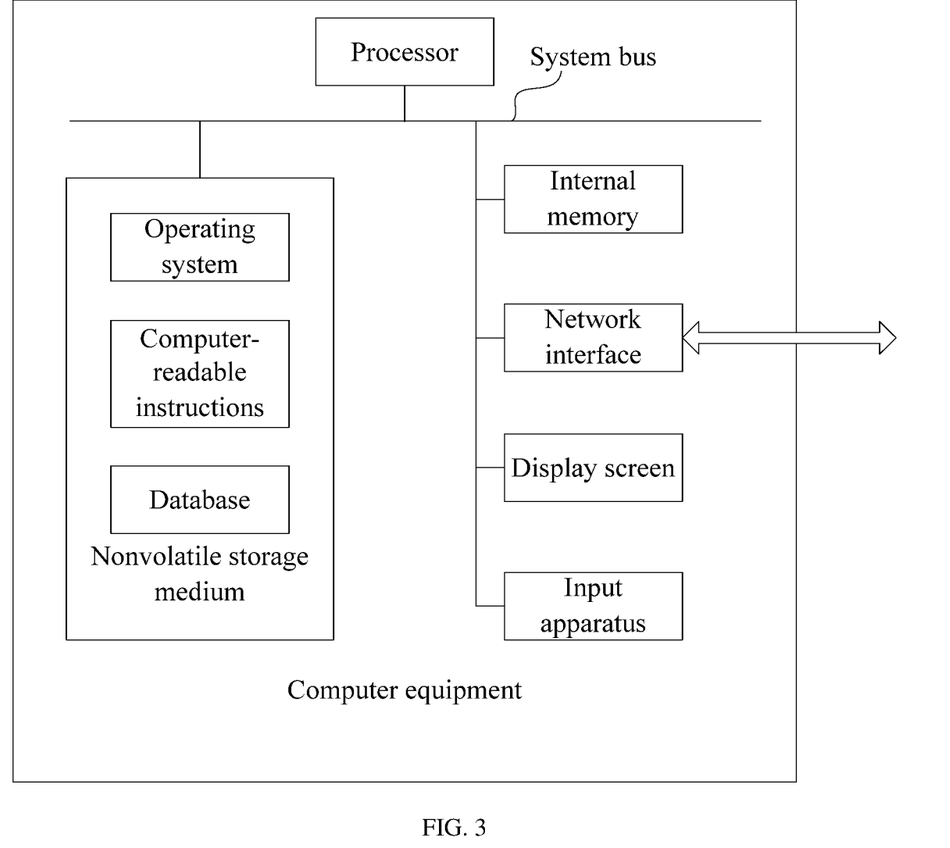
FIG. 3 is a schematic structural block diagram of a computer equipment according to an embodiment of this application.

Referring to FIG. 3, an embodiment of this application further provides a computer equipment. The computer equipment may be a server, and an internal structure of the computer equipment may be shown in FIG. 3. The computer equipment includes a processor, a memory, a network interface and a database which are connected through a system bus. The processor of the computer equipment is configured to provide computing and control capabilities. The memory of the computer equipment includes a non-volatile storage medium and an internal memory. The non-volatile storage medium stores an operating system, computer-readable instructions, and a database. The internal memory provides an operating environment for the operating system and the computer-readable instructions in the non-volatile storage medium. The database of the computer equipment is configured to store data used in a data detection method. The network interface of the computer equipment is configured to communicate with an external terminal through a network. The computer-readable instructions are executed by the processor to implement the data detection method according to any one of the foregoing embodiments. The steps of executing the data detection method by the processor includes:

obtaining a designated identification picture including a human face, where an identification image in the designated identification picture is rectangular;

correcting, by using a preset posture correction method, the designated identification picture to be placed in a preset standard posture to obtain an intermediate picture;

inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, where the plurality of face feature points are all inside the minimum bounding rectangle;

obtaining a designated identification type of the designated identification picture by using a preset identification type acquisition method, and retrieving a standard identification picture from a preset database, where the standard identification picture is of the designated identification type, the standard identification picture is marked with a reference rectangle and a reference center position, and an identification image in the standard identification picture fills the entire standard identification picture;

scaling the standard identification picture in proportion, so that an area of the reference rectangle is equal to an area of the minimum bounding rectangle, so as to obtain a scaled picture;

overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

A person skilled in the art can understand that the structure shown in FIG. 3 is merely a block diagram of a partial structure related to the solution of this application, and does not constitute a limitation on the computer equipment to which the solution of this application is applied.

An embodiment of this application further provides a computer-readable storage medium, where the computer-readable storage medium may be non-volatile or volatile and stores computer-readable instructions; the computer-readable instructions are executed by a processor to implement the data detection method according to any one of the foregoing embodiments; and the data detection method includes: obtaining a designated identification picture including a human face, where an identification image in the designated identification picture is rectangular;

correcting, by using a preset posture correction method, the designated identification picture to be placed in a preset standard posture to obtain an intermediate picture;

inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, where the plurality of face feature points are all inside the minimum bounding rectangle;

obtaining a designated identification type of the designated identification picture by using a preset identification type acquisition method, and retrieving a standard identification picture from a preset database, where the standard identification picture is of the designated identification type, the standard identification picture is marked with a reference rectangle and a reference center position, and an identification image in the standard identification picture fills the entire standard identification picture;

scaling the standard identification picture in proportion, so that an area of the reference rectangle is equal to an area of the minimum bounding rectangle, so as to obtain a scaled picture;

overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

A person of ordinary skill in the art can understand that all or some of the processes in the methods in the foregoing embodiments may be performed by a computer-readable instruction instructing related hardware. The computer-readable instruction may be stored in a non-volatile computer-readable storage medium, and when the computer-readable instruction is executed, the processes in the embodiments of the methods may be performed. Any reference to a memory, storage, a database, or other media used in the embodiments and provided in this application may include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a Random Access Memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRS-DRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

What is claimed is:

1. A data detection method, comprising:
    obtaining a designated identification picture comprising a human face, wherein an identification image in the designated identification picture is rectangular;
    correcting, by using a preset posture correction method, the designated identification picture to be placed in a preset standard posture to obtain an intermediate picture;
    inputting the intermediate picture into a preset face feature point detection model for calculation to obtain a plurality of face feature points output by the face feature point detection model;
    calculating a cluster center position of the plurality of face feature points by using a preset clustering algorithm, and generating a minimum bounding rectangle of the plurality of face feature points, wherein the plurality of face feature points are all inside the minimum bounding rectangle;
    obtaining a designated identification type of the designated identification picture by using a preset identification type acquisition method, and retrieving a standard identification picture from a preset database, wherein the standard identification picture is of the designated identification type, the standard identification picture is marked with a reference rectangle and a reference center position, and an identification image in the standard identification picture fills the entire standard identification picture;
    scaling the standard identification picture in proportion, so that an area of the reference rectangle is equal to an area of the minimum bounding rectangle, so as to obtain a scaled picture;
    overlapping the scaled picture and the standard identification picture through translation, so that a reference center position in the scaled picture overlaps a cluster center position in the intermediate picture, so as to obtain an overlapping part in the intermediate picture; and
    marking the overlapping part in the intermediate picture as an identification body of the designated identification picture.

2. The data detection method according to claim 1, wherein the step of correcting, by using a preset posture correction method, the designated identification picture to be placed in a preset standard posture to obtain an intermediate picture comprises:
    detecting a plurality of edges in the designated identification picture by using a preset image edge detection method, and obtaining a designated edge pair from the plurality of edges, wherein the designated edge pair comprises two parallel and equal designated edge line segments;
    determining whether a length of the designated edge line segment satisfies $M=\max(M1, M2, \ldots, Mn)$, wherein M is the length of the designated edge line segment, $M1, M2, \ldots, Mn$ are lengths of all the edge line segments in the plurality of edges, and the plurality of edges comprise n edge line segments in total;
    if the length of the designated edge line segment satisfies $M=\max(M1, M2, \ldots, Mn)$, placing the designated identification picture in a designated posture, so as to obtain a first picture, wherein the designated posture refers to the designated edge pair parallel to a preset reference line;
    inputting the first picture into a preset image posture classification model for calculation, so as to obtain a classification result output by the image posture classification model, wherein the classification result comprises the standard posture, the standard posture rotated counterclockwise by 90 degrees, the standard posture rotated counterclockwise by 180 degrees, or the standard posture rotated counterclockwise by 270 degrees;
    determining whether the classification result is the standard posture; and if the classification result is not the standard posture, rotating the first picture based on the classification result, so as to obtain the intermediate picture placed in the preset standard posture.

3. The data detection method according to claim 2, wherein the image posture classification model is trained based on an inception-v3 classification model, and before the step of inputting the first picture into a preset image posture classification model for calculation, so as to obtain a classification result output by the image posture classification model, wherein the classification result comprises the standard posture, the standard posture rotated counterclockwise by 90 degrees, the standard posture rotated counterclockwise by 180 degrees, or the standard posture rotated counterclockwise by 270 degrees, the method comprises:
    obtaining a first training set comprising a designated number of training samples, wherein the training samples comprise identification pictures preset to be placed in the standard posture;
    rotating all the identification pictures in the first training set counterclockwise by 90 degrees, 180 degrees, and 270 degrees, so as to correspondingly obtain a second training set, a third training set, and a fourth training set; and training a preset inception-v3 classification model through rotation training, so as to obtain the image posture classification model, wherein the rotation training means that the same number of identification pictures are extracted, as training data, from the first training set, the second training set, the third training set, and the fourth training set during the same round of training.

4. The data detection method according to claim 1, wherein the face feature point detection model is trained based on a neural network model, and before the step of inputting the intermediate picture into a preset face feature point detection model for calculation to obtain a plurality of face feature points output by the face feature point detection model, the method comprises:

obtaining pre-collected sample data, and dividing the sample data into training data and test data, wherein the sample data comprises only an identification picture placed in the standard posture and face feature points marked in the identification picture placed in the standard posture;

training a preset neural network model by using the training data and a stochastic gradient descent method, so as to obtain a temporary model;

verifying the temporary model by using the test data, and determining whether the verification succeeds; and if the verification succeeds, recording the temporary model as the face feature point detection model.

5. The data detection method according to claim 1, wherein the step of calculating a cluster center position of the plurality of face feature points by using a preset clustering algorithm comprises:

dividing the plurality of face feature points into symmetric feature points and asymmetric feature points by using a preset symmetric point classification method, wherein all the symmetric feature points are symmetric with respect to the same symmetry axis, and the symmetry axis is parallel to one edge of the identification image;

calculating a first cluster sub-center and a second cluster sub-center by using a preset clustering algorithm, wherein the first cluster sub-center is a center of all the symmetric feature points, and the second cluster sub-center is a center of all the asymmetric feature points; and recording a position of a midpoint of a line connecting the first cluster sub-center and the second cluster sub-center as the cluster center position of the plurality of face feature points.

6. The data detection method according to claim 1, wherein before the step of obtaining a designated identification type of the designated identification picture by using a preset identification type acquisition method, and retrieving a standard identification picture from a preset database, wherein the standard identification picture is of the designated identification type, and the standard identification picture is marked with a reference rectangle and a reference center position, the method comprises:

obtaining a pre-collected reference identification picture placed in the standard posture, wherein a type of the reference identification picture is the designated identification type;

inputting the reference identification picture into the preset face feature point detection model for calculation to obtain a plurality of reference face feature points output by the face feature point detection model;

calculating a cluster center position of the plurality of reference face feature points by using a preset clustering algorithm, and marking the cluster center position as a reference center position;

generating a minimum bounding rectangle of the plurality of reference face feature points, and marking the minimum bounding rectangle as a reference rectangle, wherein the plurality of reference face feature points are all inside the reference rectangle; and recording the reference identification picture marked with the reference rectangle and the reference center position as the standard identification picture.

7. The data detection method according to claim 1, wherein the step of obtaining a designated identification type of the designated identification picture by using a preset identification type acquisition method comprises:

recognizing the designated identification picture by using a preset text recognition technology, so as to obtain a text;

calculating a similarity value Sim between the text and a plurality of pre-stored reference texts by using $$Sim = \frac{\sum_{i=1}^{n} PiKi}{\sqrt{\sum_{i=1}^{n} Pi^2} \sqrt{\sum_{i=1}^{n} Ki^2}},$$

wherein P is a word frequency vector of the text, K is a word frequency vector of the reference text, Pi is the number of occurrences of the ith word in the text, and Ki is the number of occurrences of the ith word in the reference text; n is a total number of edge line segments;

obtaining a designated reference text, wherein a similarity value corresponding to the designated reference text is greater than a similarity value corresponding to any other reference text; and obtaining the designated identification type corresponding to the designated identification picture according to a preset corresponding relationship among the designated identification picture, the text, the designated reference text, and the identification type.

8. A computer equipment, comprising a memory and a processor, wherein the memory stores computer-readable instructions, and the processor implements a data detection method when executing the computer-readable instructions, wherein the data detection method comprises:

obtaining a designated identification picture comprising a human face, wherein an identification image in the designated identification picture is rectangular;

correcting, by using a preset posture correction method, the designated identification picture to be placed in a preset standard posture to obtain an intermediate picture; inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, wherein the plurality of face feature points are all inside the minimum bounding rectangle;

obtaining a designated identification type of the designated identification picture by using a preset identification type acquisition method, and retrieving a standard identification picture from a preset database, wherein the standard identification picture is of the designated identification type, the standard identification picture is marked with a reference rectangle and a reference center position, and an identification image in the standard identification picture fills the entire standard identification picture; scaling the standard identification picture in proportion, so that an area of the reference rectangle is equal to an area of the minimum bounding rectangle, so as to obtain a scaled picture;

overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

9. The computer equipment according to claim 8, wherein the face feature point detection model is trained based on a neural network model, and before the step of inputting the intermediate picture into a preset face feature point detection model for calculation to obtain a plurality of face feature points output by the face feature point detection model, the method comprises:

obtaining pre-collected sample data, and dividing the sample data into training data and test data, wherein the sample data comprises only an identification picture placed in the standard posture and face feature points marked in the identification picture placed in the standard posture;

training a preset neural network model by using the training data and a stochastic gradient descent method, so as to obtain a temporary model;

verifying the temporary model by using the test data, and determining whether the verification succeeds; and if the verification succeeds, recording the temporary model as the face feature point detection model.

10. The computer equipment according to claim 8, wherein the step of calculating a cluster center position of the plurality of face feature points by using a preset clustering algorithm comprises:

dividing the plurality of face feature points into symmetric feature points and asymmetric feature points by using a preset symmetric point classification method, wherein all the symmetric feature points are symmetric with respect to the same symmetry axis, and the symmetry axis is parallel to one edge of the identification image;

calculating a first cluster sub-center and a second cluster sub-center by using a preset clustering algorithm, wherein the first cluster sub-center is a center of all the symmetric feature points, and the second cluster sub-center is a center of all the asymmetric feature points; and recording a position of a midpoint of a line connecting the first cluster sub-center and the second cluster sub-center as the cluster center position of the plurality of face feature points.

11. The computer equipment according to claim 8, wherein before the step of obtaining a designated identification type of the designated identification picture by using a preset identification type acquisition method, and retrieving a standard identification picture from a preset database, wherein the standard identification picture is of the designated identification type, and the standard identification picture is marked with a reference rectangle and a reference center position, the method comprises:

obtaining a pre-collected reference identification picture placed in the standard posture, wherein a type of the reference identification picture is the designated identification type;

inputting the reference identification picture into the preset face feature point detection model for calculation to obtain a plurality of reference face feature points output by the face feature point detection model;

calculating a cluster center position of the plurality of reference face feature points by using a preset clustering algorithm, and marking the cluster center position as a reference center position;

generating a minimum bounding rectangle of the plurality of reference face feature points, and marking the minimum bounding rectangle as a reference rectangle, wherein the plurality of reference face feature points are all inside the reference rectangle; and recording the reference identification picture marked with the reference rectangle and the reference center position as the standard identification picture.

12. The computer equipment according to claim 8, wherein the step of obtaining a designated identification type of the designated identification picture by using a preset identification type acquisition method comprises:

recognizing the designated identification picture by using a preset text recognition technology, so as to obtain a text; calculating a similarity value Sim between the text and a plurality of pre-stored reference texts by using $$Sim = \frac{\sum_{i=1}^{n} PiKi}{\sqrt{\sum_{i=1}^{n} Pi^2} \sqrt{\sum_{i=1}^{n} Ki^2}};$$

wherein P is a word frequency vector of the text, K is a word frequency vector of the reference text, Pi is the number of occurrences of the ith word in the text, and Ki is the number of occurrences of the ith word in the reference text; n is a total number of edge line segments;

obtaining a designated reference text, wherein a similarity value corresponding to the designated reference text is greater than a similarity value corresponding to any other reference text; and obtaining the designated identification type corresponding to the designated identification picture according to a preset corresponding relationship among the designated identification picture, the text, the designated reference text, and the identification type.

13. The computer equipment according to claim 8, wherein the step of correcting, by using a preset posture correction method, the designated identification picture to be placed in a preset standard posture to obtain an intermediate picture comprises:

detecting a plurality of edges in the designated identification picture by using a preset image edge detection method, and obtaining a designated edge pair from the plurality of edges, wherein the designated edge pair comprises two parallel and equal designated edge line segments;

determining whether a length of the designated edge line segment satisfies M=max(M1, M2, . . . , Mn), wherein M is the length of the designated edge line segment, M1, M2, . . . , Mn are lengths of all the edge line segments in the plurality of edges, and the plurality of edges comprise n edge line segments in total;

if the length of the designated edge line segment satisfies M=max(M1, M2, . . . , Mn), placing the designated identification picture in a designated posture, so as to obtain a first picture, wherein the designated posture refers to the designated edge pair parallel to a preset reference line;

inputting the first picture into a preset image posture classification model for calculation, so as to obtain a classification result output by the image posture classification model, wherein the classification result comprises the standard posture, the standard posture rotated counterclockwise by 90 degrees, the standard posture rotated counterclockwise by 180 degrees, or the standard posture rotated counterclockwise by 270 degrees;

determining whether the classification result is the standard posture; and if the classification result is not the standard posture, rotating the first picture based on the classification result, so as to obtain the intermediate picture placed in the preset standard posture.

14. The computer equipment according to claim 13, wherein the image posture classification model is trained based on an inception-v3 classification model, and before the step of inputting the first picture into a preset image posture classification model for calculation, so as to obtain a classification result output by the image posture classification model, wherein the classification result comprises the standard posture, the standard posture rotated counterclockwise by 90 degrees, the standard posture rotated counterclockwise by 180 degrees, or the standard posture rotated counterclockwise by 270 degrees, the method comprises:

obtaining a first training set comprising a designated number of training samples, wherein the training samples comprise identification pictures preset to be placed in the standard posture; rotating all the identification pictures in the first training set counterclockwise by 90 degrees, 180 degrees, and 270 degrees, so as to correspondingly obtain a second training set, a third training set, and a fourth training set; and training a preset inception-v3 classification model through rotation training, so as to obtain the image posture classification model, wherein the rotation training means that the same number of identification pictures are extracted, as training data, from the first training set, the second training set, the third training set, and the fourth training set during the same round of training.

15. A non-transitory computer readable storage medium, wherein the storage medium stores computer-readable instructions, and a processor implements a data detection method when executing the computer-readable instructions, wherein the data detection method comprises the following steps:

obtaining a designated identification picture comprising a human face, wherein an identification image in the designated identification picture is rectangular; correcting, by using a preset posture correction method, the designated identification picture to be placed in a preset standard posture to obtain an intermediate picture;

inputting the intermediate picture into a preset face feature point detection model for calculation to obtain a plurality of face feature points output by the face feature point detection model;

calculating a cluster center position of the plurality of face feature points by using a preset clustering algorithm, and generating a minimum bounding rectangle of the plurality of face feature points, wherein the plurality of face feature points are all inside the minimum bounding rectangle;

obtaining a designated identification type of the designated identification picture by using a preset identification type acquisition method, and retrieving a standard identification picture from a preset database, wherein the standard identification picture is of the designated identification type, the standard identification picture is marked with a reference rectangle and a reference center position, and an identification image in the standard identification picture fills the entire standard identification picture; scaling the standard identification picture in proportion, so that an area of the reference rectangle is equal to an area of the minimum bounding rectangle, so as to obtain a scaled picture; overlapping the scaled picture and the standard identification picture through translation, so that a reference center position in the scaled picture overlaps a cluster center position in the intermediate picture, so as to obtain an overlapping part in the intermediate picture; and marking the overlapping part in the intermediate picture as an identification body of the designated identification picture.

16. The non-transitory computer readable storage medium according to claim 15, wherein the face feature point detection model is trained based on a neural network model, and before the step of inputting the intermediate picture into a preset face feature point detection model for calculation to obtain a plurality of face feature points output by the face feature point detection model, the method comprises:

obtaining pre-collected sample data, and dividing the sample data into training data and test data, wherein the sample data comprises only an identification picture placed in the standard posture and face feature points marked in the identification picture placed in the standard posture;

training a preset neural network model by using the training data and a stochastic gradient descent method, so as to obtain a temporary model;

verifying the temporary model by using the test data, and determining whether the verification succeeds; and if the verification succeeds, recording the temporary model as the face feature point detection model.

17. The non-transitory computer readable storage medium according to claim 15, wherein the step of calculating a cluster center position of the plurality of face feature points by using a preset clustering algorithm comprises:

dividing the plurality of face feature points into symmetric feature points and asymmetric feature points by using a preset symmetric point classification method, wherein all the symmetric feature points are symmetric with respect to the same symmetry axis, and the symmetry axis is parallel to one edge of the identification image;

calculating a first cluster sub-center and a second cluster sub-center by using a preset clustering algorithm, wherein the first cluster sub-center is a center of all the symmetric feature points, and the second cluster sub-center is a center of all the asymmetric feature points; and recording a position of a midpoint of a line connecting the first cluster sub-center and the second cluster sub-center as the cluster center position of the plurality of face feature points.

18. The non-transitory computer readable storage medium according to claim 15, wherein before the step of obtaining a designated identification type of the designated identification picture by using a preset identification type acquisition method, and retrieving a standard identification picture from a preset database, wherein the standard identification picture is of the designated identification type, and the standard identification picture is marked with a reference rectangle and a reference center position, the method comprises:

obtaining a pre-collected reference identification picture placed in the standard posture, wherein a type of the reference identification picture is the designated identification type;

inputting the reference identification picture into the preset face feature point detection model for calculation to obtain a plurality of reference face feature points output by the face feature point detection model;

calculating a cluster center position of the plurality of reference face feature points by using a preset clustering algorithm, and marking the cluster center position as a reference center position;

generating a minimum bounding rectangle of the plurality of reference face feature points, and marking the minimum bounding rectangle as a reference rectangle, wherein the plurality of reference face feature points are all inside the reference rectangle; and recording the reference identification picture marked with the reference rectangle and the reference center position as the standard identification picture.

19. The non-transitory computer readable storage medium according to claim 15, wherein the step of obtaining a designated identification type of the designated identification picture by using a preset identification type acquisition method comprises:

recognizing the designated identification picture by using a preset text recognition technology, so as to obtain a text;

calculating a similarity value Sim between the text and a plurality of pre-stored reference texts by using $$Sim = \frac{\sum_{i=1}^{n} P_i K_i}{\sqrt{\sum_{i=1}^{n} P_i^2} \sqrt{\sum_{i=1}^{n} K_i^2}};$$

wherein P is a word frequency vector of the text, K is a word frequency vector of the reference text, Pi is the number of occurrences of the ith word in the text, and Ki is the number of occurrences of the ith word in the reference text; n is a total number of edge line segments;

obtaining a designated reference text, wherein a similarity value corresponding to the designated reference text is greater than a similarity value corresponding to any other reference text; and obtaining the designated identification type corresponding to the designated identification picture according to a preset corresponding relationship among the designated identification picture, the text, the designated reference text, and the identification type.

* * * * *